April 27, 1943. W. C. BARNES ET AL 2,317,718
METHOD AND APPARATUS FOR DETECTING FLAWS IN MAGNETIZABLE BODIES
Filed June 6, 1938 5 Sheets-Sheet 1
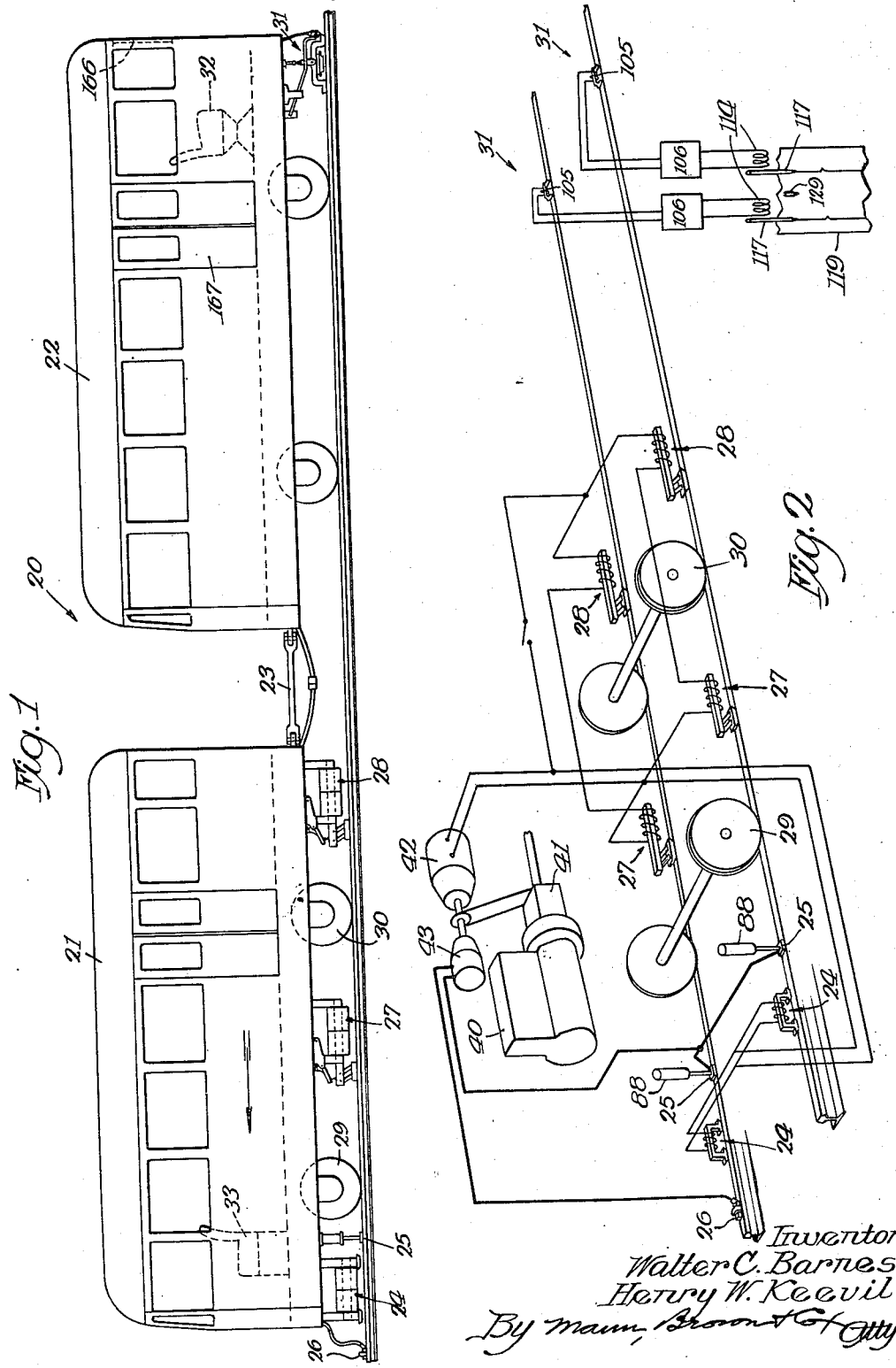
Inventors
Walter C. Barnes
Henry W. Keevil
By Mann, Brown & Attys

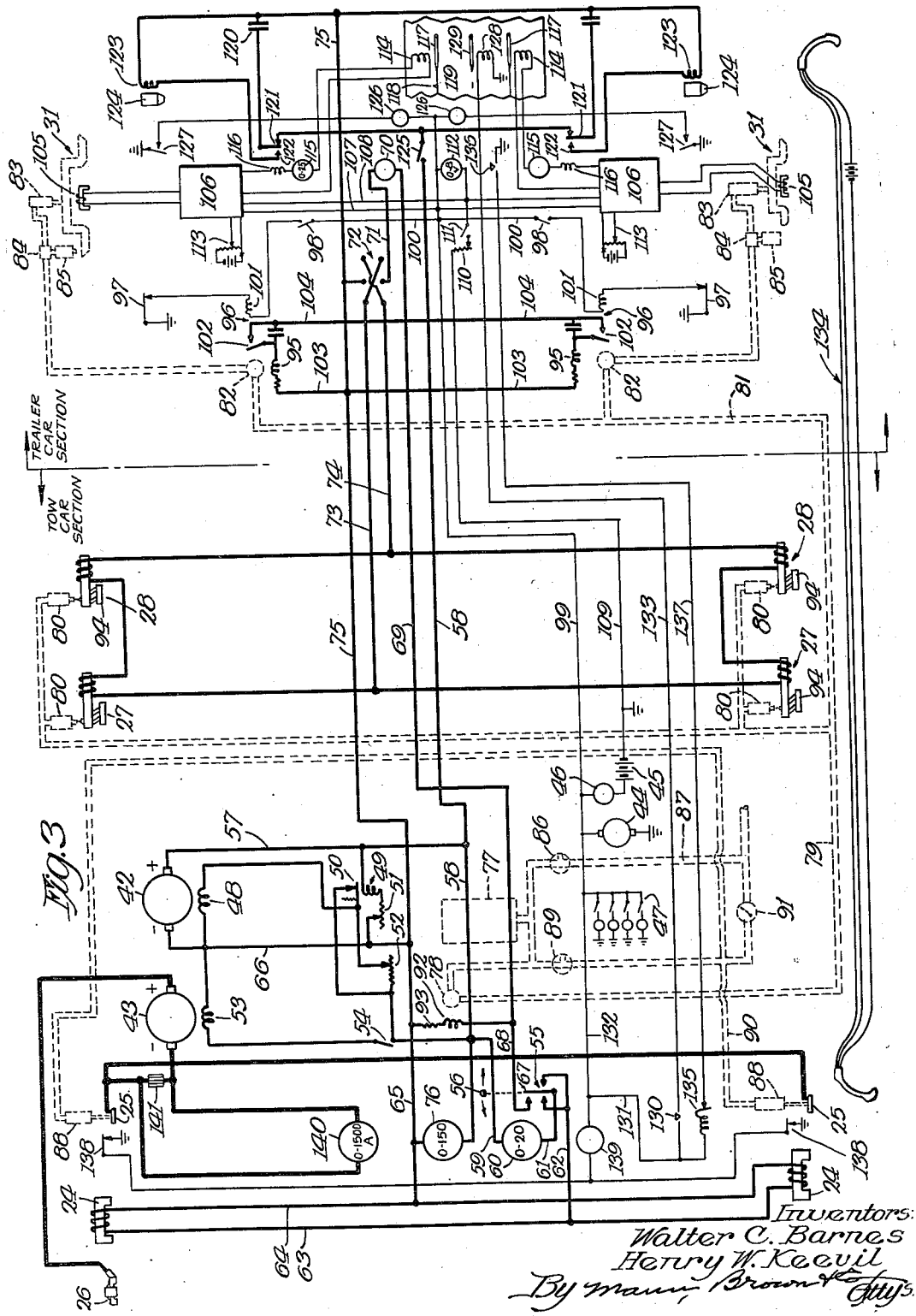
April 27, 1943.   W. C. BARNES ET AL   2,317,718
METHOD AND APPARATUS FOR DETECTING FLAWS IN MAGNETIZABLE BODIES
Filed June 6, 1938   5 Sheets-Sheet 2
Inventors:
Walter C. Barnes
Henry W. Keevil
By Mann, Brown & Ottys

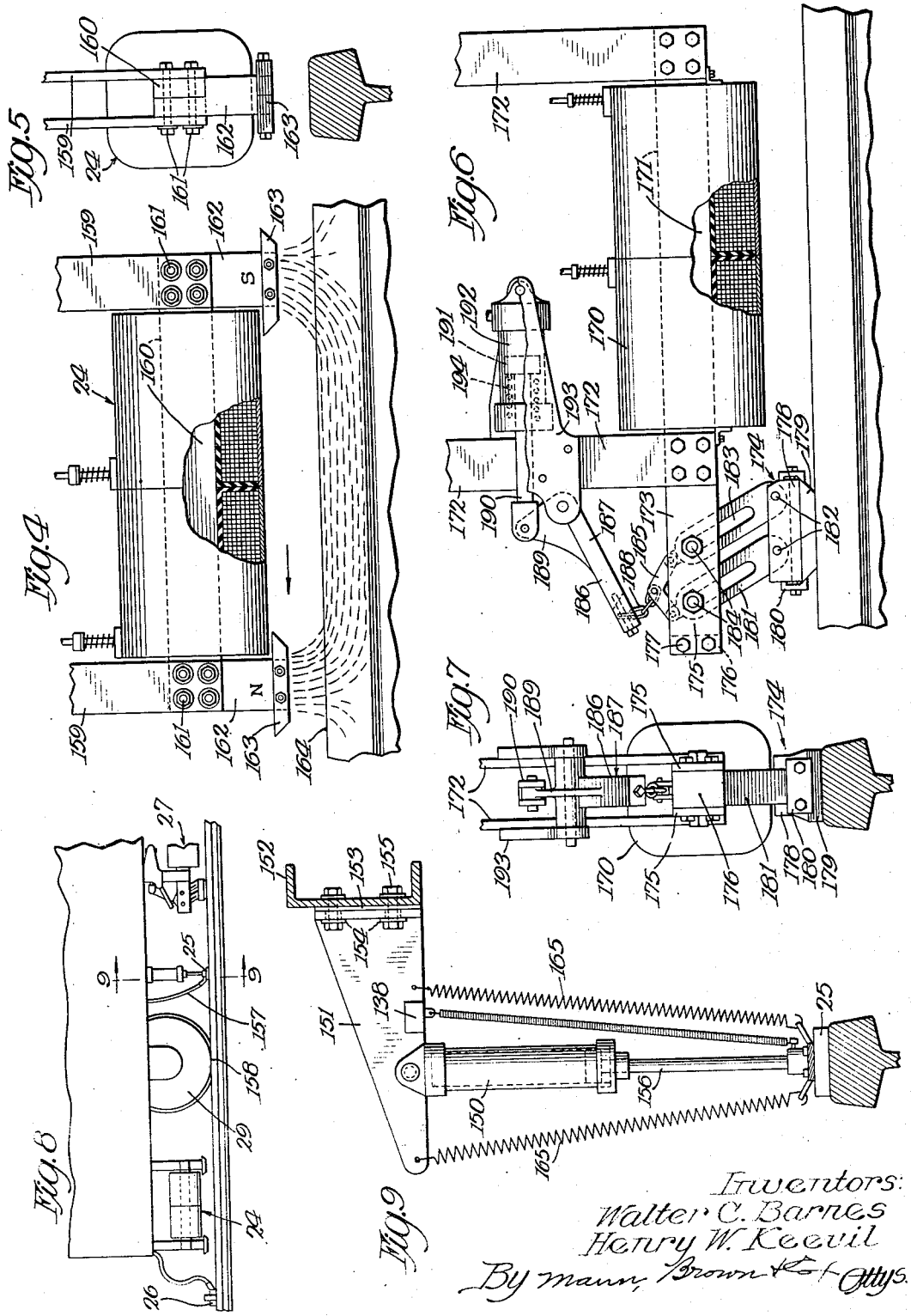

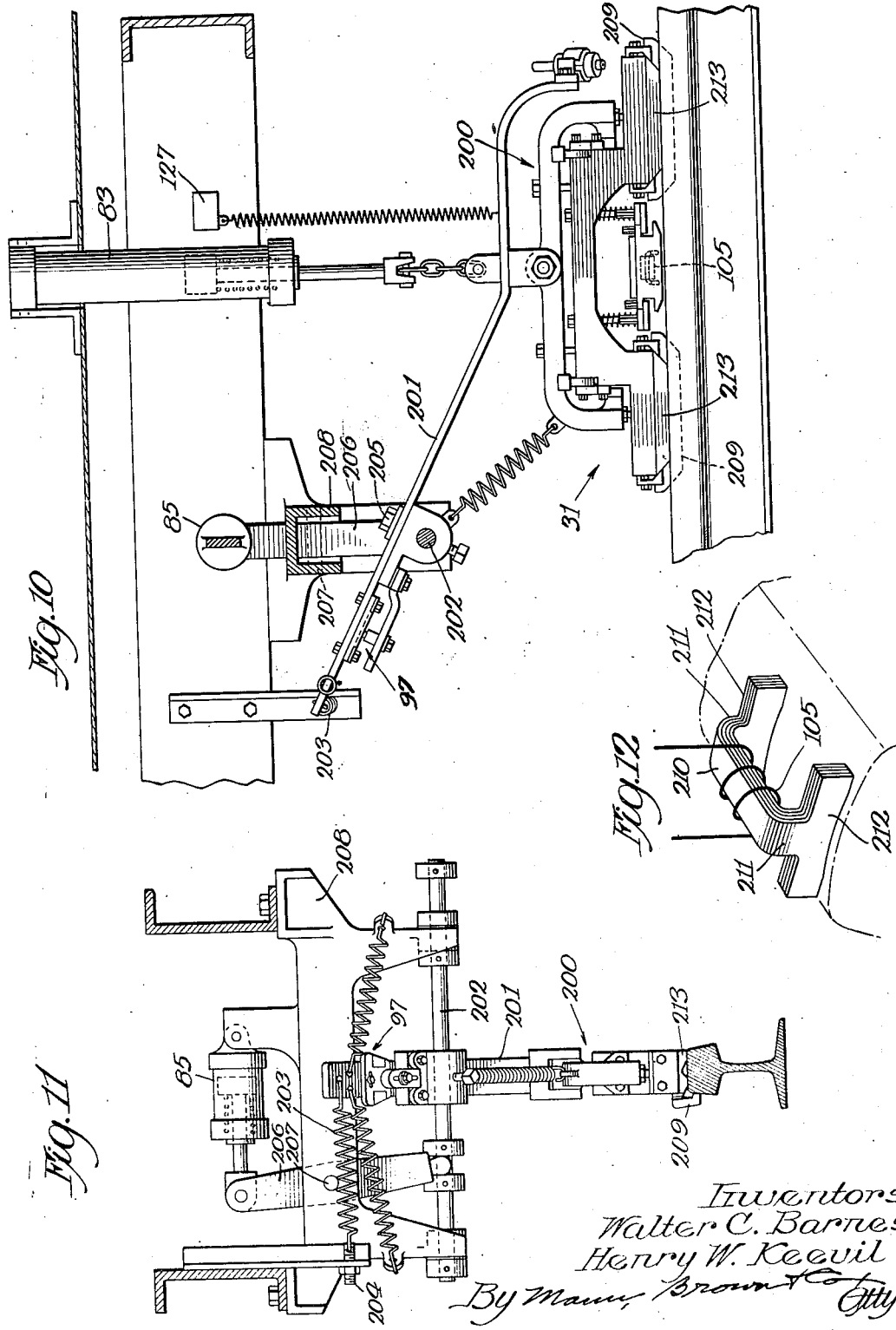

April 27, 1943.  W. C. BARNES ET AL  2,317,718
METHOD AND APPARATUS FOR DETECTING FLAWS IN MAGNETIZABLE BODIES
Filed June 6, 1938  5 Sheets-Sheet 5

Inventors:
Walter C. Barnes
Henry W. Keevil
By Mann, Brown & Co.
Attys.

Patented Apr. 27, 1943

2,317,718

UNITED STATES PATENT OFFICE 2,317,718

METHOD AND APPARATUS FOR DETECTING FLAWS IN MAGNETIZABLE BODIES

Walter C. Barnes, Lake Bluff, and Henry W. Keevil, Highland Park, Ill.

Application June 6, 1938, Serial No. 212,121

58 Claims. (Cl. 175—183)

This application is a continuation in part of our earlier application bearing the same title, Serial Number 25,586 filed June 8, 1935.

In 1936 there were approximately six thousand service failures of rail in the United States due to cracked-out transverse fissures. By that statement is meant that six thousand fractured rails in track were found during that year—some being detected by maintenance crews in time to avert wrecks, and others actually causing derailments with consequent property damage and occasional personal injury or deaths. In addition to the six thousand service failures there were roughly eight thousand detected failures, i. e., there were that number of rails found by known flaw detection methods to contain fissures making them unsafe for use in track.

Recognition of the seriousness of the problem is reflected in the fact that nearly one-third of the track mileage in the United States is tested annually by flaw detection methods in an effort to make railroad travel, which for many years has been, and still is, the safest mode of travel, even still safer.

In order that more mileage may be covered annually by detector cars it is desirable to devise flaw detection methods which require as little equipment as possible, so that the original cost to the railroads is not prohibitive and operating costs are correspondingly reasonable. But coupled with this desideratum is the necessity that the method employed be reliable and practical, for if either requirement is not satisfied the method is of little value.

The present invention, therefore, has for its principal object to provide a method and apparatus for detecting flaws in laid track which satisfies all of the above requirements.

In accomplishing this object, the invention utilizes a magnetic principle of flaw detection. The magnetic detection of flaws has been tried before our invention but because of the inability to distinguish between flaws and other causes of magnetic irregularities with a flux-responsive exploring device, such detection has been regarded as unreliable and impractical for automatic or continuous or progressive testing.

We have discovered that the uncertainty in magnetic testing has been due, not to the lack of correlation between magnetic properties and mechanical properties, but to the fact that the detection of flaws has invariably been attempted in the presence of the energizing field. That is the reason that the results obtained were neither reliable nor capable of exact interpretation, for certain variables were unavoidably present which greatly affected the final result. For example, variations in the energizing field, slight changes in the air gap between the electromagnet and body under test, slight differences in hardness and reluctance of different portions of the test piece, were responsible for much of the difficulty encountered in magnetic testing as it has heretofore been attempted.

According to our invention, these sources of uncertainty are so greatly reduced as to make exploration with a flux-responsive device highly reliable and satisfactory, the reduction resulting largely from relying on residual magnetism to actuate the exploring device.

In our method, we first set up a relatively strong magnetic field in a portion of the body under test to cause it to be uniformly magnetized in a given direction and to overcome any magnetic condition that may have previously existed in that portion of the body.

We then remove the energizing field and search the space around the body for traces of residual magnetism, because we have found that cracks, fissures and such like cause a peculiar residual magnetic condition to be set up that can be detected externally by suitable means.

Further and other objects and advantages will become apparent as the disclosure proceeds and the description is read in conjunction with the accompanying drawings, in which Fig. 1 is a side elevational view of a detector car comprising front and rear sections equipped with the present invention;

Fig. 2 is a diagrammatic view showing parts of the flaw detection equipment and a portion of the electrical circuit associated with the flaw detection apparatus;

Fig. 3 is a diagram of the more or less complete electrical circuit showing, in addition, its relationship to the pneumatic system controlling parts of the apparatus;

Figs. 4 and 5 are side and end elevational views, respectively, of the cleanup magnet;

Figs. 6 and 7 are side and end elevational views, respectively, of one of the rail-energizing magnets;

Fig. 8 is a side elevational view of a fragment of a car showing the hand check cylinder mounted in rear of the front wheel instead of in advance of that wheel, as shown in Fig. 1;

Fig. 9 is a sectional view taken on the line 9—9 of Fig. 8, showing the mounting for the hand check cylinder and the manner in which it is insulated from the car frame;

Fig. 10 is a side elevational view showing a preferred form of the flux responsive device used to detect traces of residual magnetism in the rail;

Fig. 11 is a view of the flux responsive device with its mounting, the point of vision being from the left in Fig. 10;

Fig. 12 is a perspective view showing a preferred form of detector coil used in the flux responsive device;

Figure 13:
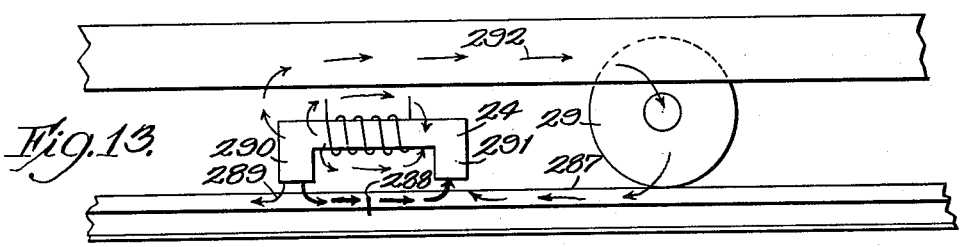
Figs. 13, 14 and 15 are diagrams that will be used in explaining some of the theory which is believed to underlie the invention.

In compliance with section 4888 of the Revised Statutes, a preferred form of the invention has been shown in the drawings and will be described herein, but it should be understood that the invention is not limited to the specific disclosure made, and that the appended claims should be construed as broadly as the prior art will permit.

In the illustrative embodiment of the invention shown the detector car, generally designated 20, comprises a front car section 21 and a rear car section 22, the former serving as a tow car and carrying the rail magnetizing equipment, and the latter serving as a trailer car and serving not only to house and carry the flaw detecting equipment, including the flux responsive device, recording apparatus, etc., but also as accommodation quarters for the car crew. The two cars are connected together by a non-magnetic coupler 23, for reasons which will hereinafter appear.

The front car section 21 is equipped with a cleanup magnet, generally designated 24, hand check apparatus including a so-called stationary contact 25, a movable contact 26, and a pair of rail energizing magnets, generally designated 27 and 28, respectively. The cleanup magnet 24 and the hand check apparatus are preferably mounted on the car in front of the front car wheel 29, the magnet 27 between the front wheel 29 and the rear wheel 30, and the magnet 28 in rear of the rear wheel 30. The flux responsive device, generally designated 31, is preferably mounted at the rear end of the trailer section 22, all as shown in Fig. 1.

The engineer in charge of tests, or the operations engineer as he is frequently called, is provided with a seat 32 at the rear of the car, and the driver or power engineer is provided with a seat 33 at the front of the car.

It should be understood that, consistent with the teachings disclosed herein, all of the equipment may be mounted on a single section car, but for practical reasons it is preferable to use a double section car.

In our earlier application hereinbefore identified, we have disclosed a method together with apparatus for detecting flaws in rails, in which the rail is first subjected to a strong unidirectional magnetic flux and subsequently, not simultaneously, exploring the space around the rail for traces of residual magnetism. We have found that this method is not only practical from the standpoint of being able to test twenty or thirty miles of track per day, but that it also makes possible the testing of track with equipment of considerably lower original cost and correspondingly lower operating cost than flaw detection equipment now in general use. However, as is the case with present commercial equipment using the electro-inductive method of testing, some fissures were missed with the equipment disclosed in our earlier application, and the present form of the invention seeks to render more reliable the method which is broadly disclosed therein. However, the patent issuing hereon is to be the basic patent of the series and hence is to cover the broad concepts of the invention as disclosed in our earlier application, as well as the present modifications.

We have found, also, on occasions that special magnetic characteristics of the rail being tested would be detected by the flux responsive device and produce an indication which could not be differentiated from a true flaw indication, although when repeated runs were made over the suspected faulty rail the indication would disappear. We also found many other mysterious phenomena in the use of this method which could not be explained by known principles of flaw detection methods.

The method and apparatus of this invention overcomes these difficulties, and provides a most reliable means for detecting flaws in laid track. Many of the inexplicable results which have been observed in experimental test work have been remedied by following the teachings of this invention. In some respects, we are not able to fully account for the improved results which are obtained by the method and apparatus of this invention, and it should be understood that any attempt to analyze the theory which is believed to be responsible for these results is to be construed not as defining a mode of operation, but merely as a possible explanation of certain physical, electrical, or magnetic phenomena which have been observed.

*General nature of the invention*

In practicing this invention on track, a car 20 is used which may comprise a front section 21 and a rear section 22 coupled at 23. The rail is progressively magnetized as by the magnets 24, 27 and 28 carried by the front section 21. The front section may also carry hand-checking apparatus 25 and 26 used when the car is stopped to check an indication made automatically as the car runs. Section 21 runs on wheels 29 and 30. Detecting apparatus 31 follows far enough behind the magnets to be outside of their effective fields and responsive to the residual magnetic fields in the vicinity of flaws in the rail. Seats 32 and 33 are provided for the operations engineer and power engineer, respectively. The operations engineer faces the receding track so as to be able to examine the rail visually whenever the detector 31 is actuated. This detector (operating through an amplifier) causes a pen 117 (Fig. 3) to make a mark on a moving tape and also causes paint gun 124 to shoot a spot of paint on the rail below the point where the flaw is detected. There are duplicate magnetizing detecting and recording means for the two rails.

*Specific description*

The car is propelled at a constant speed such as 5 M. P. H. by a 112 H. P. gasoline governor-controlled engine 40, provided with a power take-off device 41 for driving a 110 volt, 2½ k. w. direct current generator 42, and a 1,000 ampere, 1½ k. w. direct current generator 43. The two generators are mounted in tandem, and have their armatures mechanically connected. The high voltage generator 42 is used for supplying current to the main magnets 27 and 28, the cleanup magnet 24, the solenoid coils of the pneumatic valves, the solenoid coils of the paint guns, etc., while the low voltage generator 43 supplies current to the hand check contacts 25, 26, the latter being associated with a magnetic clamp which automatically grips the rail when current is flowing through the circuit.

In addition to the generators 42 and 43 there is a six volt generator 44 associated with the engine 40, and it is wired so that it floats on the battery 45 to keep the battery charged and provide current for the lighting equipment and certain parts of the signal equipment. An ammeter 46 shows the charging rate of the generator 44, and the discharge from the battery 45. As usual one side of the generator 44 is grounded with one side of the battery 45. The miscellaneous lighting circuits are indicated by the switches 47.

The field 48 of the 110 volt generator 42 is controlled by a regulator, generally designated 49, which includes a back contact relay 50 and a regulating rheostat 51. The regulator 49 permits the voltage of the generator to build up quickly as the generator is started, and when the voltage reaches the value set by the rheostat 51 the relay 50 operates to throw in the resistance 52, which is in the form of a rheostat. The regulator 49, therefore, serves both as a means for maintaining the voltage of the generator 42 relatively constant, and as a means for determining by manipulation of the rheostat 51 the value at which the generator voltage is to be maintained.

The rheostat 52 controls the field 53 of the low voltage generator 43, which field is energized whenever the switch 54 is closed. When this occurs the field 53 of the low voltage generator is thrown in parallel with the field 48 of the high voltage generator, and since the armature of the generator 43 is mechanically connected to the armature of the generator 42 the hand check apparatus is energized.

It is desirable to have the cleanup magnets 24 in operation whenever the car is going forward or rearward, but not when the car is at rest during the hand check testing. This result can readily be accomplished by associating a two-way switch 55 with the direction lever 56 of the car, the switch being arranged so that when the lever is in neutral position, as shown in Fig. 4, the contacts are open, but when in its forward or reverse position a circuit is completed between the positive side of the armature winding of the generator 42 and one or the other of the contacts comprising the switch 55. This circuit can be traced from the positive side of the generator 42 through conductors 57, 58 and 59, ammeter 60 having a range from 0–20 amperes, conductor 61, direction lever 56, switch 55, conductors 62 and 63, then through the cleanup magnets and back to the negative side of the generator 42 through conductors 64, 65 and 66.

On the other hand, it is desirable to have the main magnets 27 and 28 energized whenever the car is moving forward, but not when the car is stopped or when it is moving to the rear. This is accomplished by providing a switch 67, associated with the direction lever 56 and arranged so that when the lever is moved to forward position the circuit through the magnets 27 and 28 is closed, the circuit being traced from the positive side of the generator 42 through conductors 57, 58 and 59, ammeter 60, conductor 61, direction lever 56, switch 67, conductors 68, 69, ammeter 70 (which is a duplicate of ammeter 60), conductor 71, reversing switch 72, thence through one or the other of conductors 73 and 74, which are connected across the coils of the magnets 27 and 28, and back to the negative side of the generator through conductors 75 and 66.

Obviously when the direction lever 56 is in neutral position, or in reverse position, the switch 67 is opened so that the main magnets 27 and 28 are deenergized.

The voltage across the generator 42 may be observed on the voltmeter 76, which is connected across the negative conductors 65 and 66, and the positive conductors 58 and 57. The voltmeter is preferably capable of reading from 0 to 150 volts.

All of the flaw detection equipment which, in operative position, rests upon or is closely adjacent to the rail, must be capable of being raised to a position which is sufficiently above the rail surface, so that when the car is running light there is no danger of the equipment being damaged. The raising of all of such equipment is accomplished by springs, and the lowering of the equipment by a pneumatic system which comprises an air reservoir 77, a master control valve 78 (solenoid operated), a pipe 79 which leads to the cylinders 80 associated with the main magnets 27 and 28, a pipe 81 leading to the solenoid-operated control valves 82 which, when opened, permit air to be introduced into the cylinder 83 which moves the flux responsive device 31 downwardly to the rail surface, after which, by reason of the action of an air operated time delay device (diagrammatically indicated at 84) air is introduced into the transverse cylinders 85, which act laterally on the supporting arm of the flux responsive device and hold it against the gauge side of the rail.

The pneumatic system also includes means for operating the air brakes by manipulation of a valve 86 in pipe 87, the valve being associated with the portion of the pneumatic system controlling the hand check cylinders 88 in such a way that whenever air is allowed to enter the cylinders 88 the air brakes are applied, although the air brakes may be applied independently of the actuation of the hand check cylinders 88. This is accomplished by a system of pipes arranged so that when the valve 89 is in position to pass air from the reservoir 77 to the cylinders 88 the system automatically permits air to flow through a one-way check valve 91 to the air brakes, thereby bypassing the air brake control valve 86 and applying the brakes. Since the check valve permits air to pass only in one direction, operation of the air brake valve 86 does not permit air to pass from the reservoir 77 to the hand check cylinders 88 unless the valve 89 has been manually opened.

The solenoid 92, which operates the master control valve 78 of the pneumatic system, is connected across the conductors 65 and 68 so that it is subject to the action of the switch 67. It should be understood that there is sufficient resistance in the solenoid 92 and in the resistance 93, placed in series with the solenoid, that only a small amount of current passes through the solenoid to permit the shunt circuit, including the windings of the magnets 27 and 28, to function properly. As a result the master control valve 78 is opened whenever the switch 67 is closed, thus permitting air to flow from the reservoir 77 to the cylinders 80 to lower the movable pole pieces 94 into contact with the rail.

It should be understood that hand switches may be provided in the cleanup magnet circuit and the main magnet circuit so that these circuits can be opened irrespective of the position of the direction lever 56.

The opening of the master control valve 78 also permits air under pressure to pass into the pipe 81 for operation of the cylinders associated with the flux responsive device 31. The valve 82 which controls the passage of air from the pipe 81 to operate the cylinders is controlled by a solenoid 95, which is energized through a time delay relay 96 whenever the series switches 97 and 98 are closed to complete an electrical circuit from the battery 45 through conductors 99 and 100, switch 98, relay coil 101 of the time delay relay 96, and switch 97 to ground.

The switch 98 is a hand switch controlled by the operations engineer, and the switch 97 is an automatic switch carried on the arm which supports the flux responsive device and automatically opened whenever the arm is swung through a horizontal angle greater than normal, as, for example, when the flux responsive device is inadvertently derailed by a switch, frog, or the like. The opening of the circuit through the relay coil 101 immediately closes the contact 102, with the result that the 110 volt circuit through the solenoid 95 of the control valve 82 is immediately opened, this circuit including conductors 103 and 104, connected, respectively, to the negative and positive sides of the generator 42 through leads 75 and 58, respectively. When the switch 97 is again closed by automatic centering mechanism, the relay 96 automatically closes after a predetermined time interval, thereby energizing the solenoid 95 again and opening the control valve 82 to operate the cylinders 83 and 85.

Each of the flux responsive devices 31 on opposite sides of the car includes a detector coil 105, having its winding connected to the input side of an amplifier, generally indicated 106. The amplifier, for the purpose of this disclosure, may be considered as a conventional thermionic amplifier, the heater circuit of which includes conductors 107 and 108 connected across the battery 45 through conductors 99 and 109, respectively, a variable rheostat 110 and switch 111 being inserted in series with the latter conductor to control the feeding of current to the heating filaments of the thermionic apparatus. A voltmeter 112, connected across the conductors 107 and 108, and reading from 0-8 volts, indicates the voltage on the heater circuit.

The sensitivity of each amplifier is controlled by a grid bias rheostat 113, or equivalent means, and the output from the amplifier leads to a pen relay 114, connected in series with a milliammeter 115, preferably reading from 0-25 milliamperes, and a paint gun relay 116. The pen relay 114, when energized, actuates a pen 117 which causes an indication to be made, as shown at 118, on the record tape 119, a fragment of which is shown.

The paint gun relay 116, when energized, causes a condenser 120 to discharge through the switch armature 121, contact 122 and the operating coil 123 of the paint gun, generally indicated at 124, the condenser having been previously charged by being connected across the conductor 75 and conductor 58, which in turn connect with the negative and positive sides of the generator 42 through conductors 66 and 57, respectively. A switch 125 is provided to open the paint gun circuit when desired.

In order that the operations engineer can tell when the flux responsive devices are in proper contact with the rail, a tell-tale light signal 126 is provided for each flux responsive device. The light is illuminated whenever the switch 127, associated with the flux responsive device, is closed, this operation of the switch occurring whenever the flux responsive device is properly seated on the rail. The circuit can be traced from the battery 45 through conductor 99, signal 126, and switch 127 to ground.

In addition to the pen relays 114 which are actuated by the flux responsive devices 31, there is also a "land mark" pen relay 128, having a pen 129 which is actuated by the power engineer in the driver's seat by means of a push button 130. One side of the push button is connected by conductors 131 and 132 to the positive side of the battery 45, and the other side of the push button is connected by a conductor 133 with the operating coil of the land mark pen relay 128. Whenever a land mark indication is made by the power engineer the operations engineer places a notation alongside of the indication to identify the landmark.

When the detector car comprises a double section, the mechanical, electrical and pneumatic equipment is divided, as indicated by the appropriately labeled dotted line. In a double section car communication between the operations engineer and the power engineer is preferably maintained by a telephone, generally indicated at 134, and a buzzer system, although either or both of them may be used in a single section car, if desired. The buzzer system includes a buzzer 135 at the front of the car, and a push button 136 at the rear of the car, the two being connected in series with the battery 45 through the conductors 132, 131 and 137.

In order that the power engineer may at all times know when the hand check contacts 25, or either of them, are in their lowered position, a switch 138 is provided which is closed whenever the contact is lowered, thereby illuminating the tell-tale light signal 139 in series with the switch and the battery 45. An ammeter 140, preferably reading from zero to 1,500 amperes, is connected across a shunt 141 to indicate the current flowing between the contacts 25 and 26. As stated before, this low voltage, high amperage circuit is opened and closed by manipulation of the switch 54 in series with the field 53 of the generator 43.

Referring now to Figs. 8 and 9 particularly, in which a modified arrangement of hand check apparatus is shown, it will be seen that in this instance the hand check cylinder 150 is mounted on a bracket 151, in rear of the front wheel 29. It is important to have the contact 25 insulated from the car frame, and in this instance the electrical gap is provided by inserting an insulating plate 153 between the bracket and the frame and associating insulating washers and bushings 154 with the bolts 155 which fasten the bracket to the car frame. The reason for this is that there is a tendency for the current passing between the contacts 25, 26, to be shunted through the wheel 29, car frame 152, bracket 151, cylinder 150, and piston rod 156, back to the generator through cable 157, when the contact 25 is not insulated from the car frame; and particularly is this so when the contact 25 becomes dirty or pitted. The effect is to set up a magnetic spot at the point 158 of the wheel where the current passes from rail to the wheel, and this magnetic spot then induces an opposite pole in the rail every time it contacts with the rail for several hundred yards. When the contact is properly insulated from the frame 152 there is no opportunity for the high amperage current to pass through the wheel, and the difficulty above described is obviated.

The cleanup magnet 24, best shown in Figs. 4 and 5, is supported from the car frame by nonmagnetic stainless steel bars 159, between the lower ends of which the magnetic core 160 is clamped by bolts 161. The core is provided with downwardly extending legs 162, which are also held in place by the bolts 161, and preferably the core and legs are made of mild annealed steel. Cast iron shoes 163 are bolted to the bottom of the legs 162 to extend the transverse area of the poles to approximately the width of the rail head. The poles are preferably maintained a slight distance above the surface of the rail, and if desired the entire magnetic assembly may be mounted so that it can be raised slightly when the car is running light.

The magnet winding is preferably made in two parts, the entire winding for the magnet preferably consisting of 16,000 feet of #14 gauge copper wire for operation on 110 volts to give a resultant of approximately 25,000 ampere turns per magnet. The core 171 preferably has a cross sectional area of approximately six square inches, and the pole plates 175, links 181 and shoe 178 preferably have such shape and size that the energizing flux travelling through the iron circuit always has not less than six square inches of cross-sectional area through which to pass. It should be understood, of course, that the mention of six square inches for the magnetic circuit is merely illustrative and that the figure may vary as service conditions demand.

The purpose of the cleanup magnet is to accomplish what its name implies, i. e., remove local magnetism in the rail before the rail is subjected to the flux from the main magnets 27, 28. Assuming that the left leg 162 of the magnet in Fig. 4 is a north pole, and that the right leg is a south pole, it will be seen that when the magnet is moved to the left, as indicated by the arrow, the point 164 on the rail first becomes a south pole by induction as the north pole passes over it, and then a north pole as the south pole of the magnet passes over it. There may even be other reversals due to leakage flux, but in any event all points on the rail are subjected to at least one strong reversal of flux as the magnet passes over the rail. This has a tendency to remove residual magnetism in the rail, and the magnets 27, 28, will ordinarily not restore the residual magnetic spot unless a fissure is present.

On occasions the cleanup magnet will not remove a strong magnetic spot present in the rail, with the result that the flux responsive device will pick up the residual field at the spot and cause an indication to be made on the record tape. When this occurs, or, for that matter, whenever any indication is produced on the record tape which the operations engineer can observe through the rear window 166 of the car does not correspond with some visible surface defect on the rail, the operations engineer presses the push button 136 to signal the driver to stop. The car is then backed up by placing the direction lever 56 in reverse and automatically the main magnets 27 and 28 are deenergized, although the cleanup magnets 24 remain energized.

On the rearward run the cleanup magnet again causes a strong reversal of flux to take place in the rail, and when the car has been backed up a sufficient distance to enable a repeat run to be made the operations engineer again presses the push button 136 and a second run over the suspected rail is made under ordinary testing conditions, with the direction lever 56 forward to again close the circuit through the main magnets 27, 28, and to keep the circuit closed through the cleanup magnets 24. Again the latter magnets cause a strong reversal of flux in the rail, after which the main magnets 27, 28, send a strong unidirectional flux through the rail.

If the repeat run again produces the indication on the record tape which was before observed, the car is stopped and the operations engineer gets out of the car with the millivoltmeter that is used in connection with the electrical drop in potential hand testing apparatus. The operations engineer then takes the movable contact 26 and places it on the rail in front of the suspected fissure, while the power engineer lowers the contact 25 and closes the switch 54, adjusting, if necessary, the field rheostat 52 to see that a sufficient current is being passed through the rail. The power engineer can perform all of these duties from the seat 33, and when that has been done the operations engineer then makes a hand test of the rail, and if the hand test or secondary flaw detection system verifies the indication of the primary flaw detection system the rail is known to be defective and its removal is immediately ordered.

After the hand test has been completed the operations engineer places the movable contact 26 on a hook provided at the front of the car, the power engineer raises the contacts 25 by manipulating the valve 89, which permits the springs 165 to raise the contacts, then opens the switch 54, and finally moves the car forward so that the operations engineer can mount the car through the door 167. The test work is then continued with the primary flaw detection apparatus until another indication of the same character is received, when the procedure above described is repeated.

The main magnets 27 and 28 are identical with one another, and their construction is best illustrated in Figs. 6 and 7. The specifications for the coils 170 of the main magnets are the same as those for the cleanup magnets 24. The core 171 of the magnet is supported by stainless steel bars 172 depending from the car frame, and the forward end of the core is extended beyond the supporting bar to form a box housing 173 in which a vertically movable pole piece, generally designated 174, is adapted to reciprocate. The sides of the housing 173 are formed by mild steel bars 175, rigidly secured at their rear ends to the front supporting bars 172 of the magnet, and held in spaced relation at the front by a spacer 176 by bolts 177.

The movable pole piece 174 consists of a block 178 of magnetic material, to the bottom of which a wear shoe 179, preferably of non-magnetic manganese steel, is clamped by removable brackets 180. The pole block 178 is dished out to receive links 181, which are pinned to the block by pins 182, and which are provided with slots 183, in which pins 184, extending between the side walls 175 of the housing, are adapted to travel. The upper ends of the links 181 are connected by a strap 185, to the center of which the operating arm 186 of a bell-crank lever 187 is connected by a chain 188. The other arm 189 of the bell-crank lever is connected by a push rod 190 to the piston 191 of the lift cylinder 192, which is rigidly mounted by brackets 193 on the front supporting arms 172 of the magnet. The pole piece 174 is held in inoperative position by a spring 194 in the lift cylinder 192, and the pole piece is lowered by admitting compressed air to the cylinder 192.

When the pole piece is in the position shown in Fig. 6, it is free to ride with limited vertical movement on the surface of the rail, as is apparent from the drawings.

It should be understood that the core 171, core extensions 175, links 181, and pole block 178, are all made of high grade magnetic material, as, for example, mild steel, so that flux set up by the current flowing through the windings of the magnet is carried along the core links and pole block through the rail.

The exact distance between the core 171 and the rail, must be determined somewhat empirically, depending upon the height of the car underframe from the rail. Preferably the core is approximately six inches above the rail surface, and 14 inches below the frame.

The advantage in using an L-shaped magnet for sending magnetic flux through the rail to polarize fissures, and in using more than one of such magnets in tandem, is fully disclosed in our copending application Serial No. 142,562, filed May 14, 1937, from which the next few paragraphs explaining one theory to account for this advantage are substantially copied.

For convenience of terminology, a flux which directly opposes the ultimate direction of magnetism which is to be left in the fissure as residual magnetism will be termed "reversed flux"; a flux which is at right angles to the ultimate direction of flux (i. e. which enters the rail laterally) will be termed a "demagnetizing flux"; and a flux which tends to build up the ultimate residual magnetism will be termed a "magnetizing flux."

With the above terminology in mind, the following presumably takes place when the U-shaped magnet 24 traverses a fissure 288, having reference to Fig. 13.

1. The forwardly directed stray field 289 sends a weak reversed flux through the fissure.
2. The main body of flux flowing from the forward pole 290 of the magnet into the rail sends a strong demagnetizing flux through the fissure.
3. The main body of flux in traveling through the rail from the forward pole 290 to the rear pole 291 sends a strong magnetizing flux through the fissure.
4. The main body of flux in leaving the rail to enter the rear pole 291 sends a strong demagnetizing flux through the fissure.
5. The stray field 292 which travels along the underframe through the wheel 29 and forwardly along the rail 287 sends a weak reversed flux through the fissure.

Figure 14:
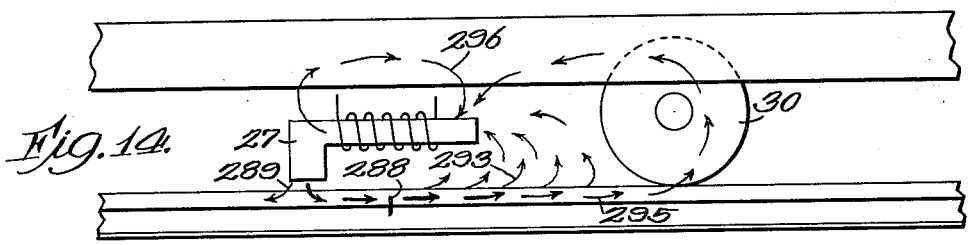

Now, by comparison, let us see what presumably takes place when a magnet of the form disclosed at 27 and 28 and claimed herein is used in place of a U-shaped magnet (see Fig. 14).

1. The weak reversed flux 89 exists as before.
2. The strong demagnetizing flux caused by the main body of flux entering the rail laterally (mostly vertically) immediately over the fissure is also still present.
3. The strong magnetizing flux caused by the main body of flux traveling rearwardly through the rail exists as before, and while it is not as strong because of the greater air gap in the magnetic circuits, its net effect is infinitely greater due to substantial elimination of the subsequent demagnetizing flux, as explained in paragraph 4 below.

4. Since the rear pole 291 has been eliminated, there is no strong demagnetizing flux caused by the main body of flux leaving the rail, but instead, there is a comparatively weak, vertical, demagnetizing flux 293 which is distributed for a considerable distance beyond the magnet. Obviously, if the wheel 30 is too close to the magnet, it will tend to increase the vertical, demagnetizing flux, and hence is to be avoided. Furthermore, the weak, vertical field in combination with the gradual manner in which the field leaves the rail reduces the possibility of false indications due to surface conditions such as corrugations, burns, and the like.

5. The stray flux 295 which travels rearwardly through the rail and through the wheel 30 tends to crowd the reverse stray flux 292 of Fig. 13 out of the rail and hence reduces this reverse flux as indicated at 296.

From the above, it is quite clear that the L-shaped magnet, or magnet of equivalent shape, of this invention is greatly superior to a U-shaped magnet and tests have borne out that fact.

In addition, the use of two magnets in place of one produces a new and unexpected result. The result is unexpected for one reason because increasing the size and capacity of a single magnet will not give the desired results, and furthermore, because the magnets must be either spaced apart a sufficient distance so that there will be no interlinkage of flux, or a magnetic shield must be provided. For example, two L-shaped magnets placed between the wheels 29 and 30 of the car shown in Fig. 1 are substantially no better than a single L-shaped magnet, although a single L-shaped magnet is infinitely better than a U-shaped magnet.

Figure 15:
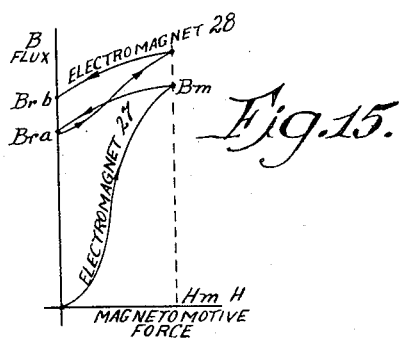

A possible explanation of this phenomenon is shown in Fig. 15. Although no verification of this curve has as yet been obtained, the ultimate result of increased residual magnetism has been definitely established.

In Fig. 15, the most plausible explanation of the phenomenon which we have been able to deduce is shown using that portion of the hysteresis loop which seems to apply to the conditions which exist in our arrangement. Starting with zero flux B and zero magnetomotive force and applying a magnetomotive force of $H_m$ to the body under test, the flux in the body reaches a maximum at $B_m$ and then falls to $B_{ra}$ as the magnet moves over the portion of the rail under test. The character of the moving magnet would seem to insure that there is no countermagnetomotive force applied to the rail.

Although Spooner in "Properties and Testing of Magnetic Materials," published by McGraw-Hill Company of New York, 1927, indicates at pages 362 and 363 that under somewhat similar circumstances, a second application of positive magnetomotive force will bring the residual magnetism down to the same point $B_{ra}$ after the second magnetomotive force has been removed, our experience has shown that the residual magnetism does not fall to $B_{ra}$, but instead falls back to a higher value such as $B_{rb}$, and it may be that the mechanical shock that is delivered to the rail by the wheel interposed between the two magnets may have some effect in producing this result. The fact is that the residual magnetism is greater when the method and apparatus of this invention is used than when a single magnet is used.

The method which we use may be described as successively subjecting the body under test to an energizing flux, substantially removing the energizing flux, subjecting it to another energizing flux, substantially removing the second energizing flux and then testing the body for residual magnetism, or viewed from a slightly different angle, the method consists in subjecting the body under test to a varying magnetic flux having at least two high intensity periods interspersed with a relatively low intensity period, and then testing for residual magnetism.

The flux responsive device 31 comprises a detector carriage, generally designated 200, which is supported from the car underframe by an arm 201, pivoted on a horizontal shaft 202, and having its upper end connected, by an adjustably tensioned spring 203, to the car underframe by a fastener 204. The arm 201 has a vertical pivot 205, about which the arm is pivoted when the gauge pressure cylinder 85 has compressed air admitted to it to move the entire detector carriage assembly, including the horizontal supporting shaft 202, laterally through the action of a lever 206, fulcrumed at 207 to a cross-support 208 secured to the car underframe.

When the flux responsive device is being lowered to the rail the lift cylinder 83 is first supplied with air to lower the carriage vertically until it makes contact with the rail, after which the time delay device 84 functions to admit air to the cylinder 85 to shift the entire carriage assembly laterally, which causes the spring 203 to become tensioned, thereby exerting a lateral force on the carriage to bring the gauge shoes 209 of the carriage against the gauge edge of the rail. Since the detector carriage per se forms no part of the present invention, further description is unnecessary other than to say that the carriage is capable of following all contours of the rail with ease, so that the induction coil 105 carried by the carriage is kept in proper spaced relationship to the rail.

Preferably the coil 105, best shown in Fig. 12, has a core 210 extending parallel to the axis of the rail, and terminating in downwardly extending legs 211, which are widened out, as indicated at 212, to approximately the width of the rail. Preferably, also, the central portion of the feet 212 is slightly cut away to maintain a more uniform air gap between all portions of the feet and the rail.

The reason why it is particularly desirable to use a double section detector car is to enable the flux responsive device 31 to be placed as far from the main magnets 27 and 28 as possible. It has been found in actual practice that the flux which is set up by the magnets 27, 28, extends rearwardly as much as five or six feet (and frequently much greater distances) behind the wheel immediately in rear of the rear magnet 28, even though a shunt iron circuit is formed by the car frame and that wheel. When the flux responsive device is located within the field of either of the magnets 27, 28, any increase in flux which may be deemed necessary or desirable to increase the energization of the rail is offset by the deadening effect of the stray field on the pickup, and by the necessary decrease in sensitivity of the amplifiers to prevent false indications from being picked up by the flux responsive device.

We have found that when we place the flux responsive device far behind the rearmost magnet 28 we can increase the strength of the magnets 27, 28, without adversely affecting the flux responsive device, with the result that not only is it possible to send a stronger flux through the rail to obtain better polarization of the fissures, but also it is possible to use a more sensitive setting of the amplifier to more certainly detect fissures.

It is believed that this explanation accounts for the phenomenon which we observed when, with a single section car having the magnet 28 in front of the rear wheel and the flux responsive device 31 immediately in rear of that wheel, we found that on occasions it was possible to pick up fissures with the magnets de-energized which could not be picked up when the magnets were energized. This phenomenon was very baffling until we discovered, after many unsuccessful efforts, that the apparent cause of the difficulty was in the heretofore unsuspected fact that the stray portions of the field from the magnet 28 extended so far behind the rear wheel.

The non-magnetic coupling 23 between the tow and trailer sections of the car further reduces the possibility of stray flux from adversely affecting the flux responsive device. This end can be still further assured by having the front wear shoe 213 of the detector carriage 200, together with the detector carriage itself, made of cast iron or other magnetic material, the effect being to shunt any stray flux which may find its way to the carriage from the car frame back to the rail without going through the pickup coil 105.

It should be observed that the car wheels of the trailer section 22 form an iron circuit between the car frame and the rail, so that there is a strong tendency for any stray flux which is traveling rearwardly, either through the car frame or the rail, to be shunted back to the magnets without reaching the flux responsive device 31.

We have found in some instances that the detection of flaws is made more certain by introducing the magnetizing flux into the rail in a direction which assists, rather than opposes, the earth's magnetic field. In other words, when the car is running in a northerly direction we have found it advantageous to have the polarity of the magnets such that the magnetic field produced by the magnets and responsible for the polarity of the residual field at fissures is in a northerly direction and hence works with the earth's magnetic field rather than against it. On the other hand, when the car is moving in a southerly direction, this effective field is reversed by throwing the reversing switch 72 to its alternate position.

A strange phenomenon which has been found to exist is in the discovery that the polarity of the pickup coils 105 must bear a definite relationship to the polarity of the magnets. In other words, when the magnets are given a particular polarity due to the position of the reversing switch 72, the pickup coils are most effective when they are connected to the amplifier in one of two possible ways (i. e. polarities), and when the polarity of the magnets is reversed due to a change in direction of the car, or for some other reason, the polarity or connection between the pickup coil and the amplifier should likewise be changed.

It should be understood that in Fig. 3 all of the controls indicated for the tow car section are conveniently placed within reach, or within sight, of the power engineer, while all the controls for the trailer car section are within reach or within sight of the operations engineer. The same situation is true when all of the equipment is mounted in a single section car, the only difference being that all of the equipment is then in the one car section.

We claim as our invention:

1. The method of locating relatively deep internal flaws in rails which consists in moving magnetic flux means progressively along successive portions of a rail to send flux therethrough and polarize the faces of such flaws, and then passing a flux responsive device over the portion thus energized but maintaining a distance between the magnetic flux means and the flux responsive device such that only the residual magnetism as distinguished from the flux from the magnetic flux means in the vicinity of such flaws affects the flux responsive device.

2. Apparatus for locating relatively deep internal flaws in rails comprising means for progressively sending magnetic flux through successive portions of a rail to establish characteristic residual magnetic conditions in the vicinity of such flaws, a flux responsive device, means for mounting the flux responsive device for movement over the portions of the rail thus energized, said flux responsive device being spaced a sufficient distance from the first-named means so that only the residual magnetism as distinguished from the flux from the magnetic flux means in the vicinity of such flaws affects the device.

3. In apparatus for locating relatively deep internal flaws in rails, the combination of a longitudinally extending magnet adapted to establish characteristic residual magnetic conditions in the vicinity of such flaws, a flux responsive device, means for mounting the magnet and the device for movement along a rail, said means maintaining a sufficient distance between the magnet and the device so that only the residual magnetism at fissures and not the magnetizing flux of the magnet affects and actuates the device.

4. The method of locating relatively deep internal flaws in rails which consists in sending, by means of a magnetizing device, a relatively strong magnetic flux progressively through successive portions of a rail to establish characteristic residual magnetic conditions in the vicinity of such flaws and progressively testing said portions by means of a testing device for traces of residual magnetism in the vicinity of such flaws while maintaining a sufficient space interval between the magnetizing and testing devices so that the latter is not adversely affected by the magnetizing field of the former as distinguished from the residual field which it sets up and leaves in the vicinity of flaws.

5. In apparatus for locating relatively deep internal flaws in rails, a vehicle comprising front and rear cars, a magnet mounted on the front car for sending a relatively strong magnetic flux through the rail, a flux responsive device mounted on the rear car for locating traces of residual magnetism left on the rail by the magnet, and a non-magnetic coupler between the cars.

6. Apparatus for locating relatively deep internal flaws in rails comprising means for progressively sending magnetic flux through successive portions of a rail to establish characteristic residual magnetic conditions in the vicinity of such flaws, a flux responsive device mounted for movement over the portions of the rail thus energized and spaced from said means a sufficient distance so that only the residual magnetism left in the vicinity of such flaws by said means affects the device, and means in advance of the first-named means for sending alternating magnetic flux of low frequency through the rail.

7. Apparatus for locating relatively deep internal flaws in rails comprising means for progressively sending magnetic flux through successive portions of a rail to establish characteristic residual magnetic conditions in the vicinity of such flaws, a flux responsive device mounted for movement over the portions of the rail thus energized and spaced from said means a sufficient distance so that only the residual magnetism left in the vicinity of such flaws by said means affects the device, and a cleanup magnet in advance of the first-named means for sending magnetic flux through each increment of rail length with at least one reversal of direction in magnetic flux.

8. Apparatus for locating relatively deep internal flaws in rails comprising means for progressively sending magnetic flux through successive portions of a rail to establish characteristic residual magnetic conditions in the vicinity of such flaws, a flux responsive device mounted for movement over the portions of the rail thus energized and spaced from said means a sufficient distance so that only the residual magnetism left in the vicinity of such flaws by said means affects the device, and a U-shaped cleanup magnet in advance of the first-named means having its poles closely adjacent to the rail.

9. Apparatus for locating relatively deep internal flaws in rails comprising means for progressively sending magnetic flux through successive portions of a rail to establish characteristic residual magnetic conditions in the vicinity of such flaws, a flux responsive device mounted for movement over the portions of the rail thus energized and spaced from said means a sufficient distance so that only the residual magnetism left in the vicinity of such flaws by said means affects the device, and a U-shaped cleanup magnet in advance of the first-named means having its poles closely adjacent to the rail, said magnet including an energizing coil and means for supplying direct current to said coil.

10. In a detector car for locating flaws in rails, the combination of rail-energizing means for progressively sending magnetic flux through successive portions of a rail, a flux responsive device, means for mounting the flux responsive device for movement over the portions of the rail thus energized, a cleanup magnet positioned in advance of the rail-energizing means, and means rendering inoperative the rail-energizing means when the car is moved rearwardly without disturbing the operability of the cleanup magnet.

11. The method of detecting flaws in rails which consists in successively traversing a given portion of the rail with first a cleanup magnet adapted to send a slowly alternating magnetic flux through said portion of the rail, then with rail-energizing means adapted to pass a unidirectional magnetic flux through said portion of the rail, and finally a flux responsive device for locating traces of residual magnetism in said portion of the rail, then passing the same three elements over said portion of the rail in reverse order with at least the rail-energizing means rendered inoperative and the cleanup magnet operative, and then repeating the first series of rail treatment including the successive traversing of said portion of the rail by the cleanup magnet, the rail-energizing means and the flux responsive device in the order named.

12. The method of detecting flaws in rails which consists in progressively subjecting successive portions of the rail to the action of a unidirectional flux, then traversing the rail with a shunt iron circuit to intercept stray fields through the rail, and then at a distance of at least five feet from the shunt iron circuit traversing the rail with a flux responsive device.

13. In an apparatus for detecting flaws in rails, the combination of a detector car, rail-energizing means mounted on the car for progressively sending a unidirectional flux through successive portions of the rail, a flux responsive device positioned in rear of the rail-energizing means for locating traces of residual magnetism, and means for reversing the direction of the unidirectional flux so that it may be made to act with rather than against the earth's magnetic field in accordance with the direction in which the car is moving.

14. In apparatus for detecting flaws in rail, a car, a magnet mounted on the car for sending a relatively strong magnetic flux through the rail, a flux responsive device mounted in rear of the magnet for locating traces of residual magnetism left in the rail by the magnet, and a substantially closed iron circuit of low reluctance between the magnet and the flux responsive device.

15. In apparatus for detecting flaws in rail, a car, a magnet mounted on the car for sending a relatively strong magnetic flux through the rail, a flux responsive device mounted in rear of the magnet for locating traces of residual magnetism left in the rail by the magnet, and a substantially closed iron circuit of low reluctance between the magnet and the flux responsive device, said flux responsive device comprising a magnetic yoke and flux responsive means mounted between the legs of the yoke.

16. In apparatus for locating relatively deep internal flaws in rails, a vehicle comprising front and rear cars, a magnet mounted on the front car for sending a relatively strong magnetic flux through the rail to establish characteristic residual magnetic conditions in the vicinity of such flaws, and a flux responsive device mounted on the rear car for locating traces of residual magnetism left in the vicinity of such flaws by the magnet, said magnet and device being spaced apart a sufficient distance so that no substantial part of the magnetic flux reaches the device and the device is responsive to residual flux only.

17. In apparatus for locating relatively deep internal flaws in rails, the combination of means for setting up residual magnetic fields in the vicinity of fissures, means responsive to the existence of said residual fields and so located and arranged as to be responsive to said fields only, and means positioned in advance of the first-named means for removing local residual magnetism in the rail.

18. Apparatus for locating relatively deep internal flaws in rails comprising means for progressively sending magnetic flux through successive portions of a rail to establish characteristic residual magnetic conditions in the vicinity of such flaws, a flux responsive device, means for mounting the flux responsive device for movement over portions of the rail thus energized to locate traces of residual magnetism left in the rail in the vicinity of such flaws by the rail-energizing means, said mounting means being such that the flux responsive device is responsive to residual magnetism only, and means in advance of the rail energizing means for sending a magnetic flux through each increment of rail length with at least one reversal in the direction of said last-mentioned magnetic flux.

19. The method of locating relatively deep internal defects in rails which consists in progressively applying to successive portions of the rail rail-conditioning means capable of setting up characteristic residual magnetic conditions in the vicinity of said defects, and subsequently, not simultaneously, progressively exploring with inductive means the space around said portions of the rail whereby the passing of the inductive means through the residual magnetic field will cause the inductive means to produce a flaw indication.

20. The method of locating relatively deep internal and cracked-out fissures in rails which consists in setting up a magnetic flux in a rail in a direction that will polarize the faces of the fissures and of sufficient strength to wipe out the special characteristics of any existing magnetic conditions, removing the source of flux, and then locating the fissures by progressively exploring the space around the rail with an induction coil to detect residual magnetism in the vicinity of the polarized fissures.

21. The method of locating relatively deep internal and cracked-out fissures in rails which consists in progressively setting up a magnetic flux in the rail in a direction that will polarize the faces of the fissures and of sufficient strength to wipe out the special characteristics of any existing magnetic conditions, removing the source of flux, and then locating the fissures by detecting means moved through the residual magnetic fields in the vicinity of the fissures.

22. The method of locating relatively deep internal flaws in rails which consists in sending, by means of a magnetizing device, a relatively strong magnetic flux progressively through successive portions of the rail to establish characteristic residual magnetic conditions in the vicinity of such flaws, and progressively testing said portions by means of a testing device for traces of residual magnetism in the vicinity of such flaws while preventing any substantial portion of the magnetizing field set up by the magnetizing device from acting upon the testing device.

23. The method of locating relatively deep internal defects in rails which consists in first removing the residual magnetism present in the rail, then progressively applying to successive portions of the rail rail-conditioning means capable of setting up characteristic magnetic conditions in the vicinity of said defects, and subsequently, not simultaneously, progressively exploring with inductive means the space around said portions of the rail, whereby the passing of the inductive means through the residual magnetic field will cause the inductive means to produce a flaw indication.

24. In a car for locating relatively deep internal flaws in track including a leading section and a trailer section, means carried by the leading section for setting up a uni-directional magnetic flux through a limited portion of the track, and detecting means mounted on the trailer section and including a detector unit adapted to produce an electrical impulse whenever it traverses a magnetic field, said detector unit being mounted on the trailer section and beyond the effective magnetizing field set up by said flux producing means, whereby when the car is moved forward the detector unit passes progressively over portions of the track that had been previously magnetized by said means, said detector unit being responsive to the residual magnetism set up at internal and cracked-out fissures by the flux producing means.

25. In a car for locating relatively deep internal flaws in track including a leading section and a trailer section, means carried by the leading section for setting up a uni-directional magnetic flux through a limited portion of the track, detecting means mounted on the trailer section and including a detector unit adapted to produce an electrical impulse whenever it traverses a magnetic field, said detector unit being mounted on the trailer section and beyond the effective magnetizing field set up by said flux producing means, whereby when the car is moved forward the detector unit passes progressively over portions of the track that had been previously magnetized by said means, said detector unit being responsive to the residual magnetism set up at internal and cracked-out fissures by the flux producing means, and a non-magnetic coupler joining the leading car section with the trailer car section.

26. The method of locating relatively deep internal defects in rails laid in track which consists in progressively passing a strong magnetic flux longitudinally through portions of the rail to establish characteristic residual magnetic conditions in the vicinity of such defects, and then, after the rail magnetizing means has passed beyond, progressively exploring the space around the rail with a magnetically responsive device to locate said characteristic magnetic conditions.

27. The method of locating relatively deep internal defects in rails laid in track which consists in progressively passing a strong magnetic flux longitudinally through portions of the rail to establish characteristic residual magnetic conditions in the vicinity of such defects, and then, after the rail magnetizing means has passed beyond, progressively exploring the space around the rail with a device that is responsive to components of flux that are parallel to the axis of the rail.

28. The method of locating relatively deep internal defects in rails which consists in progressively applying to successive portions of the rail rail-conditioning means capable of setting up characteristic magnetic conditions in the vicinity of said defects, and subsequently, not simultaneously, progressively exploring the space around said portions of the rail for traces of residual magnetism.

29. The method of testing rails for internal defects which consists in setting up a magnetic flux through a portion of the rail of sufficient strength to wipe out the special characteristics of any existing magnetic conditions, and subsequently, not simultaneously, exploring the space around said portions of the rail for traces of residual magnetism.

30. Apparatus for testing rails for latent defects, comprising means for progressively setting up relatively strong magnetic fields in limited portions of the rail, and means for progressively testing said portions, after the energizing field has moved beyond, for traces of residual magnetism, said last named means including an induction coil.

31. In a car for locating flaws in track, means for setting up a uni-directional magnetic flux through a limited portion of track, and a detector unit on the car located in rear of said means and outside of its field of operation, whereby when the car is moved forward, the detector unit passes progressively over portions of the track that have been previously magnetized by said means, said detector unit being responsive to the residual magnetism set up at internal and cracked-out fissures by the flux producing means.

32. In a car for locating flaws in track, means for setting up a uni-directional magnetic flux through a limited portion of the track, and detecting means mounted on the car and including a detector unit adapted to produce an electrical impulse whenever it traverses a magnetic field and a recorder in the car for recording said impulse, said detector unit being mounted on the car in rear of said rail magnetizing means and outside of its field of operation whereby when the car is moved forward the detector unit passes progressively over portions of the track that have been previously magnetized by said means, said detector unit being responsive to the residual magnetism set up at internal and cracked-out fissures by the flux producing means.

33. The method of locating internal defects in rails laid in track which consists in running a car over the track, simultaneously introducing into the rail a strong longitudinal magnetic flux to set up characteristic residual magnetic conditions in the vicinity of flaws, and then later running another car over the track, and simultaneously with the running of the second car over the track locating said characteristic residual magnetic conditions by detector means capable of producing an electrical impulse when traversing such fields.

34. Apparatus for detecting flaws in rail comprising a first car, rail magnetizing means mounted on the first car and adapted to introduce a strong longitudinal magnetic flux into the rail to set up characteristic residual magnetic conditions in the vicinity of fissures, a second car, and detector means mounted on the second car adapted to produce an electrical impulse whenever said detector means traverses one of said characteristic residual magnetic fields.

35. In a car for locating flaws in track, means for setting up a uni-directional longitudinal magnetic flux through a limited portion of track, and a detector unit on the car located in rear of said means and outside of its field of operation whereby when the car is moved forward the detector unit passes progressively over portions of the track that have been previously magnetized by said means, said detector unit including a detector coil mounted with its longitudinal axis substantially parallel to the rail whereby it is responsive to the residual magnetism set up by the longitudinal flux at internal and cracked-out transverse fissures.

36. The method of detecting flaws in a ferromagnetic body which consists in subjecting the body to an energizing force which when removed leaves a residual magnetic field in the vicinity of such flaws, and then locating said field by moving a flux responsive device along the body in a path that will cause the device to produce an indication when it traverses said field.

37. The method of detecting flaws in an elongated ferro-magnetic body which consists in progressively energizing the body with a magnetizing means to establish a residual magnetic field in the vicinity of the flaws and then after the magnetizing means has passed beyond, locating said field by moving a flux responsive device along the body in a path that will cause the device to produce an indication when it traverses said field.

38. The method of detecting flaws in a ferromagnetic body which consists in subjecting the body to the action of an energizing force directed along the longitudinal axis of the body and establishing residual magnetic fields in the vicinity of such flaws, and then locating said field by moving an induction coil along the body in a path that will cause the device to produce an indication when it traverses said field, said coil being positioned with its longitudinal axis substantially parallel to the longitudinal axis of the body.

39. The method of progressively detecting flaws in a magnetizable body which consists in progressively subjecting a portion of the body to an energizing flux, substantially removing the energizing flux therefrom, progressively subjecting said portion of the body to another energizing flux, substantially removing the second energizing flux therefrom, and then testing said portion of the body for residual magnetism in the vicinity of flaws.

40. The method of detecting flaws in a magnetizable body which consists in successively subjecting the body to an energizing flux, substantially removing the energizing flux, subjecting it to mechanical shock, subjecting it to another energizing flux, substantially removing the second energizing flux and then testing the body for residual magnetism.

41. The method of progressively detecting flaws in a magnetizable body which consists in progressively subjecting a portion of the body to a varying magnetic flux having at least two high intensity periods interspersed with a relatively low intensity period, and then testing said portion of the body for residual magnetism in the vicinity of flaws.

42. The method of preparing an elongated magnetizable body for being tested for flaws which consists in laterally introducing a relatively strong magnetic flux progressively into the body in such a manner that the main body of flux has a tendency to pass rearwardly through the body and then gradually leave the body along a substantial length thereof.

43. The method of polarizing flaws in elongated magnetizable bodies which consists in forcing a strong energizing flux laterally into and longitudinally through the body in a given direction and then allowing the flux to gradually leave the body along a substantial length thereof.

44. The method of polarizing flaws in elongated magnetizable bodies which consists in laterally introducing a strong energizing flux into the body, then causing it to pass longitudinally through the body, and finally to gradually leave the body along a substantial length thereof.

45. In flaw detecting apparatus, a car, flaw detecting apparatus mounted on the car including a pair of magnets, a magnetically responsive detector, means for mounting the magnets and detector so that when the car moves in a given direction the two magnets successively and substantially independently impress their fields upon the body under test, and are then followed by the detector which locates traces of residual magnetism.

46. In a flaw detecting apparatus for locating flaws in track, a car adapted to travel along the track and having at least two wheels of magnetic material on one rail, a magnet mounted in advance of the forward wheel, a magnet mounted intermediate the front and rear wheels and a detector mounted in rear of the latter wheel adapted to locate traces of residual magnetism in the rail.

47. In flaw detecting apparatus for locating flaws in track, a car adapted to travel along the track and having at least two wheels on one rail, a magnet mounted in advance of the forward wheel, an L-shaped magnet mounted intermediate the front and rear wheels, and a detector mounted in rear of the latter wheel adapted to locate traces of residual magnetism in the rail.

48. In flaw detecting apparatus for locating flaws in track, a car adapted to travel along the track and having at least two wheels on one rail, an L-shaped magnet mounted in advance of a forward wheel, an L-shaped magnet mounted intermediate said forward and a rear wheel, and a detector mounted in rear of the latter wheel adapted to locate traces of residual magnetism in the rail.

49. In flaw detecting apparatus for locating flaws in an elongated metallic body, which apparatus includes a detector for indicating residual magnetism in the vicinity of flaws, means for subjecting a portion of said body to a magnetic flux which is substantially stronger in one longitudinal direction than in the other, said means including a magnet having an L-shaped core the poles of which lie in a plane substantially parallel to the longitudinal axis of the body under test.

50. In flaw detecting apparatus for locating flaws in an elongated metallic body, which apparatus includes a detector for indicating residual magnetism in the vicinity of flaws, means for subjecting a portion of said body to a magnetic flux which is substantially stronger in one longitudinal direction than in the other, said means including a magnet having a core the poles of which lie in a plane substantially parallel to the longitudinal axis of the body under test, one of said poles being in close proximity to the body under test and the other pole being substantially farther away from said body, and displaced longitudinally of the body with respect to said one pole.

51. In flaw detecting apparatus for locating flaws in an elongated metallic body, which apparatus includes a detector for indicating residual magnetism in the vicinity of flaws, means for subjecting a portion of said body to a magnetic flux which is substantially stronger in one longitudinal direction than in the other, said means including a magnet having a core the poles of which lie in a plane substantially parallel to the longitudinal axis of the body under test, said core being shaped so that it concentrates the flux as it is introduced into the body under test, then directs the major portion of the flux longitudinally in one direction through the body and finally disperses it gradually as it is drawn from said body.

52. The method of preparing a portion of an elongated magnetizable body for testing for flaws when the ends of the body are not accessible, which comprises the steps of creating a magnetic field having lines of force entering the body laterally in one area and leaving the body laterally in another area longitudinally spaced from the first area, the lines of force being relatively close together in one of said areas and relatively spaced apart in the other of said areas, and moving said magnetic field along the body in the direction toward the area in which the lines of force are relatively close together.

53. The method of preparing a portion of an elongated magnetizable body for testing for flaws when the ends of the body are not accessible, which comprises the steps of creating a magnetic field having lines of force extending longitudinally in the body and entering and leaving the body through two principal areas on the lateral surface thereof, at least one of said areas having a length substantially greater than the maximum transverse dimension of said body and having the lines of force distributed over said area, and moving said magnetic field along the body in the direction toward the other of said areas.

54. The method of preparing a portion of an elongated magnetizable body for testing for flaws when the ends of the body are not accessible, which comprises the steps of creating a plurality of magnetic fields spaced along the body and moving the spaced magnetic fields in one direction along the body, each of said magnetic fields having lines of force entering the body laterally in one area and leaving the body laterally in another area spaced longitudinally of the first area in the direction opposite to the direction of movement of the magnetic fields, and said lines of force being relatively close together in the area in which they enter the body and relatively spaced apart in the area in which they leave the body.

55. The method of preparing a portion of an elongated magnetizable body for testing for flaws when the ends of the body are not accessible, which comprises the steps of creating a plurality of magnetic fields spaced along the body and having lines of force extending longitudinally in the body, and moving the magnetic fields in one direction along the body, the lines of force of each magnetic field entering and leaving the body through a pair of longitudinally spaced areas on the lateral surface of the body, said areas moving with the magnetic field and the rearmost area of each pair being substantially longer than the maximum transverse dimension of the body and having the lines of force distributed along its length.

56. The method of preparing a portion of an elongated magnetizable body for testing for flaws when the ends of the body are not accessible, which comprises the steps of creating a magnetic field having a flux extending longitudinally in the body and entering and leaving the body in lateral areas thereon, and moving the magnetic field along the body, the flux per unit area in the last of said areas to pass a given point on the body as the magnetic field is moved being substantially less than the maximum flux per unit area within said body.

57. The method of detecting flaws in rail which consists in conditioning the rail by setting up characteristic residual magnetic conditions in the vicinity of flaws, and then locating said flaws by searching for the characteristic magnetic conditions by induction means having its longitudinal axis substantially parallel to the longitudinal axis of the rail.

58. The method of detecting flaws in a ferromagnetic body which consists in subjecting the body to an energizing force which when removed leaves a characteristic residual magnetic field in the vicinity of such flaws, substantially removing the energizing force from said vicinity, and then locating said field by producing relative movement of a flux responsive device along the body in a path that will cause the device to produce an indication when it traverses said field.

WALTER C. BARNES.
HENRY W. KEEVIL.